United States Patent [19]

Akao

[11] Patent Number: 5,017,429

[45] Date of Patent: May 21, 1991

[54] PACKAGING MATERIAL FOR PHOTOSENSITIVE MATERIALS

[75] Inventor: Mutsuo Akao, Kanagawa, Japan

[73] Assignee: Fuji Photo Film Co., Ltd., Minami-Ashigara, Japan

[21] Appl. No.: 464,664

[22] Filed: Jan. 11, 1990

Related U.S. Application Data

[63] Continuation of Ser. No. 194,092, May 16, 1988, abandoned.

[30] Foreign Application Priority Data

May 15, 1987 [JP] Japan .................. 62-118559

[51] Int. Cl.$^5$ .................. C09J 7/02; B32B 15/08
[52] U.S. Cl. .................. 428/349; 428/354; 428/355; 428/458; 428/461; 428/516; 428/522; 428/913
[58] Field of Search .................. 428/461, 463, 138, 215, 428/209, 457, 349, 355, 354, 913, 458, 516, 513, 522, 218, 220, 36.92; 242/68.7

[56] References Cited

U.S. PATENT DOCUMENTS

| | | | |
|---|---|---|---|
| 4,147,291 | 4/1979 | Akao et al. | 428/218 |
| 4,258,848 | 3/1981 | Akao et al. | 428/461 |
| 4,331,725 | 5/1982 | Akao | 428/138 |
| 4,337,285 | 6/1982 | Akao et al. | 428/354 |
| 4,356,224 | 10/1982 | Akao et al. | 428/220 |
| 4,359,499 | 11/1982 | Akao et al. | 428/461 |
| 4,386,124 | 5/1983 | Akao | 428/463 X |
| 4,411,943 | 10/1983 | Akao | 428/513 X |
| 4,411,945 | 10/1983 | Akao et al. | 428/461 X |
| 4,436,809 | 3/1984 | Akao et al. | 428/209 X |
| 4,452,846 | 6/1984 | Akao | 428/461 X |
| 4,469,741 | 9/1984 | Akao | 428/516 X |
| 4,513,050 | 4/1985 | Akao | 428/516 |
| 4,565,733 | 1/1986 | Akao | 428/215 |
| 4,565,743 | 1/1986 | Akao | 428/913 X |
| 4,576,865 | 3/1986 | Akao | 428/349 |
| 4,579,781 | 4/1986 | Akao | 428/461 |
| 4,584,234 | 4/1986 | Hirose et al. | 428/516 X |
| 4,587,175 | 5/1986 | Akao | 428/461 X |
| 4,629,640 | 12/1986 | Akao | 428/354 X |
| 4,639,386 | 1/1987 | Akao | 428/36.92 |
| 4,653,640 | 3/1987 | Akao | 428/461 X |
| 4,661,395 | 4/1987 | Akao | 428/461 |
| 4,661,401 | 4/1987 | Akao | 428/516 |
| 4,663,218 | 5/1987 | Akao | 428/461 |
| 4,687,692 | 8/1987 | Akao | 428/220 X |
| 4,708,896 | 11/1987 | Akao | 428/349 |
| 4,730,778 | 3/1988 | Akao et al. | 242/68.7 |

Primary Examiner—Thomas J. Herbert
Attorney, Agent, or Firm—Burns, Doane, Swecker & Mathis

[57] ABSTRACT

A packaging material for photosensitive materials which comprises a laminated film comprising a thermoplastic resin heat seal layer and a metal foil or metallized flexible sheet layer laminated through a linear low density polyethylene resin extrusion laminating adhesive layer of which the resin composition is 30 to 90 wt. % of linear low density polyethylene resin being a copolymer resin of ethylene and α-olefin and 70 to 10 wt. % of high pressure low density polyethylene resin, the melt index of the blended resin is 5 to 20 g/10 minutes, the density of the blended resin is 0.870 to 0.930 g/cm$^3$, the optical density of the transmitted light of said laminated film is more than 4.0, and the moisture permeability of the laminated film is less than 2.0 g/m$^2$.24 hours.

7 Claims, 3 Drawing Sheets

PACKAGING MATERIAL FOR PHOTOSENSITIVE MATERIALS

This application is a continuation of application Ser. No. 194,092, filed May 16, 1988, now abandoned.

BACKGROUND OF THE INVENTION

1. Field of the Invention

This invention relates to a packaging material for photosensitive materials, and more particularly, this invention relates to a packaging material suitable for the photographic photosensitive materials having sharp edges and a heavy weight, such as sheet films not having round corners including lithfilm and cut film, roll film and rolled photographic printing paper.

2. Description of the Prior Art

As the laminated films for photosensitive materials of which physical strength have been improved, the present inventor has already disclosed various packaging materials. For example, the packaging material illustrated in FIG. 17 is composed of an aluminum foil layer 9a and two uniaxially stretched high density polyethylene (HDPE) resin films 10a laminated on both sides of the aluminum foil layer each through a low density polyethylene (LDPE) resin extrusion adhesive layer 5' so that their molecular orientation axes cross each other (U.S. Pat. No. 4,331,725). Another packaging material for weight photosensitive materials is composed of a foamed sheet and two uniaxially stretched films laminated on both sides thereof so that their molecular orientation axes cross each other (U.S. Pat. No. 4,565,733).

Moreover, as regards the packaging material using linear low density polyethylene (L-LDPE) resin, the inventor has disclosed a light-shielding film of which properties are improved by blending a light-shielding material (U.S. Pat. No. 4,452,846).

Before these packaging materials have been developed, the double sheet gusset bag combining the inner sheet shown in FIG. 16 and an outer sheet having three layer composition was used for packaging photographic photosensitive materials requiring the strongest physical strength. The inner sheet is composed of a light-shielding LDPE resin film layer 8a, a metal foil layer 9 laminated thereon through an adhesive layer 5', a flexible sheet layer 4 laminated thereon through an adhesive layer 5' and another light-shielding LDPE resin film layer 8a further laminated thereon through an adhesive layer 5'.

The tear strength of the packaging material disclosed in U.S. Pat. No. 4,331,725 is remarkably improved. However, when the packaging material is made into a single sheet bag having little buffer action, such as the light-shielding moistureproof bag for packaging a rolled photographic photosensitive material, it became liable to be broken by the sharp edge of the roll. Moreover, the single sheet bag had a problem in heat seal strength and other heat seal properties, such as sealability in low temperature and pinhole formation. The equipment cost including molding machine for the production of uniaxially stretched film was expensive, and generation of cutting loss was also great. Therefore, this packaging material was expensive. The packaging material of FIG. 16 was used as the inner sheet of a conventional double sheet gusset bag, and combined with the outer sheet composed of Clupak paper and a light-shielding LDPE resin film layer laminated thereon through a LDPE resin adhesive layer. However, the double sheet gusset bag was also broken by the sharp edge of a photographic photosensitive material. The packaging material disclosed in U.S. Pat. No. 4,565,733 had buffer action, and it was excellent in physical strength. However, its bag-making ability particularly for automatic bag-making machine was inferior. Generation of the cutting loss of uniaxially stretched film was great, and the packaging material was expensive. This packaging material was difficult to be put to practical use other than the packaging bag substitute for metal can and the packaging bag for a bulk roll in view of processibility and cost.

SUMMARY OF THE INVENTION

An object of the invention is to provide a packaging material excellent in physical strength, bag-making ability and film moldability.

Another object of the invention is to provide an inexpensive packaging material usable for various photosensitive material including a heavy photographic photosensitive material having sharp edges.

The present invention provides a packaging material for photosensitive materials which has achieved these objects. Such a packaging material comprises a laminated film comprising a thermoplastic resin heat seal layer and a metal foil or metallized flexible sheet layer laminated through a linear low density polyethylene resin extrusion laminating adhesive layer of which the resin composition is 30 to 90 wt. % of linear low density polyethylene resin being a copolymer resin of ethylene and α-olefin and 70 to 10 wt. % of high pressure low density polyethylene resin, the melt index of the blended resin is 5 to 20 g/10 minutes, the density of the blended resin is 0.870 to 0.930 g/cm$^3$, the optical density of the transmitted light of said laminated film is more than 4.0, and the moisture permeability of the laminated film is less than 2.0 g/m$^2$.24 hours.

DETAILED DESCRIPTION OF THE INVENTION

Figure 1:
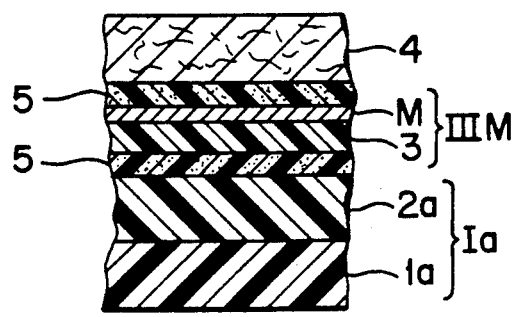
FIGS. 1 to 10 are partially sectional views of the packaging materials embodying the invention.

The linear low density polyethylene (L-LDPE) resin is called third polyethylene resin, and it is a low cost high strength resin, having the advantages of both low, medium density polyethylene resin and high density polyethylene resin, which meets the requirements, i.e. resource conservation and energy conservation, of the times. The L-LDPE resin is a copolymer of ethylene and α-olefin, and it has a linear structure having short branches. The number of carbon atoms of the α-olefin is 3 to 13, usually 4 to 10. Preferable α-olefin has a number of carbon atoms of 4 to 8, and examples of the α-olefin are butene-1, 4-methylpentene-1, hexane-1, heptene-1 and octene-1. The ethylene content of L-LDPE resin is usually 85 to 99.5 mol. %, i.e. α-olefin content is 0.5 to 15 mol. %, and the density is usually in the range of 0.87 to 0.95 g/cm$^3$. The L-LDPE resin is synthesized by low pressure method, medium pressure method, or modified high pressure method. Examples of commercial L-LDPE resin are "G-Resin", "NUC-FLX" and "TU- FLIN" (UCC), "Dowlex" (Dow Chemical), "Suclear" (DuPont de Nemour, Canada), "NUC POLYETHYLENE-LL" and "TUFTHENE" (NUC), "Marlex" (Phillips), "Neozex" and "Ultzex" (Mitsui Petrochemical INdustries), "Nisseki Linirex" (Nippon Petrochemicals), "Stamilex" (DSM), "IDEMITSU POLYETHYLENE-L" and "MORETEC" (IDEMITSU PETROCHEMICALS) and the like. In view of physical strength, adhesive strength and laminating ability such as little neck-in, excellent ductility and rare pinhole generation, preferable L-LDPE resin has an ethylene content of 90 to 99.5 mol. %, i.e. an α-olefin content of 0.5 to 10 mol. %, a melt index (MI) of 0.8 to 30 g/10 minutes (ASTM D-1238) and a density of 0.870 to 0.935 g/cm$^3$ (ASTM D-1505), and it is produced by vapor phase and/or liquid phase process. When the L-LDPE resin used has a MI of higher than 4 g/10 minutes, preferably higher than 8 g/10 minutes, neck-in can be made little and extrusion load can be decreased.

In view of processibility alone, the content of L-LDPE resin is preferably less. However, when the content of high pressure low density polyethylene (LDPE) resin is too high, the advantages of the L-LDPE resin exhibit insufficient in ductility, prevention of pinhole, laminating speed, heat sealability, physical strength, etc. Suitable content of L-LDPE resin in the resin composition is 30 to 90 wt. %, preferably 50 to 85 wt. %, further preferably 60 to 80 wt. %. Though processibility is improved by blending LDPE resin alone, the fluidity of the blend resin is further improved by blending a lubricant, wax, a higher fatty acid or carbon black. The blended resin is excellent in physical strength, particularly in tear strength and Gelbo test strength.

The high pressure low density polyethylene (LDPE) resin is produced by tube process and autoclave process, and the LDPE resin produced by autoclave process is preferable in view of little neck-in. The density is preferably 0.915 to 0.930 g/cm$^3$, and the MI is preferably higher than 2 g/10 minutes, more preferably higher than 5 g/10 minutes.

Suitable content of LDPE resin in the resin composition is 10 to 70 wt. %. When the LDPE resin content is beyond 70 wt. %, the ductility, the prevention of pinhole become inferior. While, when the LDPE resin content is less than 10 wt. %, the neck-in cannot be improved. Moreover, extrusion load becomes large, and blending cost is raised.

In the extrusion laminating adhesive layer, L-LDPE resin is blended with LDPE resin. Therefore, when the discharge of the blended resin is adjusted to the same as the conventional case of using LDPE resin alone, discharge pressure is raised and motor load increases. Therefore, in order to lower discharge pressure and motor load, it is necessary to blend L-LDPE resin with LDPE resin so that the melt index of the blended resin becomes 5 to 20 g/10 minutes (ASTM D-1238) and the density becomes 0.870 to 0.930 g/cm$^3$ (ASTM D-1505).

Since the L-LDPE resin extrusion laminating adhesive layer is inferior in the adhesive strength onto paper, various oriented films are used particularly uniaxially or biaxially stretched thermoplastic resin films, such as polyester film, polyamide film, polyethylene film, polypropylene film and polystyrene film, of which draw ratio is more than 3 times, metal membrane layers such as aluminum vacuum deposited membrane layer, metal foils such as aluminum foil and iron foil, cellophane, and unstretched films other than ethylene copolymer such as nylon, polypropylene and polyethylene. Therefore, the temperature of the molten resin to be extruded is necessary to be controlled to 250° to 350° C. according to the material to be laminated.

An oxidation inhibitor is added into the L-LDPE resin extrusion laminating adhesive layer in order to resist such a high temperature, and suitable oxidation inhibitors are phenol oxidation inhibitors, sulfur-containing oxidation inhibitors, phosphorus-containing oxidation inhibitors and the like. The phenol oxidation inhibitors include n-octadecyl-3-(3',5'-di-t-butyl-4'-hydroxyphenyl)propionate, 2,6-di-t-butyl-4-methylphenol, 2,6-di-t-butyl-p-cresol, 2,2'-methylenebis(4-methyl-6-t-butylphenol), 4,4'-thiobis(3-methyl-6-t-butylphenol), 4,4'-butylidenebis(3-methyl-6-t-butylphenol), stearyl-β-(3,5-di-4-butyl-4-hydroxyphenyl)-propionate, 1,1,3-tris(2-methyl-4-hydroxy-5-t-butylphenyl)butane, 1,3,5-trimethyl-2,4,6-tris(3,5-di-t-butyl-4-hydroxybenzyl) benzene and tetrakis[methylene-3(3',5'-di-t-butyl-4'-hydroxyphenyl)propionate]methane. The sulfur-containing oxidation inhibitors include dilauryl-3,3'-thiodipropionate, dimyristyl-3,3'-thiodipropionate, laurylstearylthiodipropionate, distearyl-3,3'-thiodipropionate and ditridecyl-3,3'-thiodipropionate. The phosphorus-containing oxidation inhibitors include trinonylphenylphosphite and triphenylphosphite. Among them, the phenol oxidation inhibitors are the most preferable. Commercial products belonging to the phenol oxidation inhibitors include various "IRGANOX" (CIBA-GEIGY AG) and "SUMILIZER BHT", "SUMILIZER BP-76", "SUMILIZER WX-R" and "SUMILIZER BP-101" (SUMITOMO CHEMICAL CO., LTD.). It is preferable that two or more oxidation inhibitors are combined, because synergistic effect is often exhibited. Since oxidation inhibitor is added to the adhesive layer being an intermediate layer, the content of oxidation inhibitor may be more than the thermoplastic resin heat sealing layer disposed as the inner surface layer. The content is, in general, preferably less than 0.5 wt. %, and in the case of utilizing for packaging the photographic photosensitive materials using oxidation-reduction reaction, it is preferably less than 0.3 wt. % in order to prevent the degradation of the photographic photosensitive materials such as fogging. Suitable content is determined by considering the composition, sensitivity and the like of the photographic photosensitive materials to be packaged and the temperature of the molten resin.

Various surface treatments are effective for the improvement of adhesive strength in addition to the elevation of the resin temperature. The combination of the following anchor coating agent and physical treatment is particularly effective, because the necessary adhesive strength can be secured at a lower resin temperature. By the lowering of resin temperature, neck-in is little, and the oxidation of resin decreases.

The adhesive strength of the adhesive layer may be improved by coating an anchor coating agent, physical surface treatment, chemical agent treatment, or etc.

Anchor coating agent is a generic name of adhesive promoter and cross-linking agent used in the film of laminating, and it is also called primer. Representative examples of the anchor coating agent are as follows:
Organic titanate anchor coating agent Tetrapropyl titanate or tetraisobutyl titanate is used as the principal constituent, and tetrastearyl titanate is added as a hydrolysis-adjusting agent. Polyethyleneimine anchor coating agent.

A relatively high polymer of ethyleneimine $(CH_2-CH_2-NH)_{\overline{n}}$ is used. This agent is particularly preferable because its handling is easy and its pot life is long. Polyisocyanate anchor coating agent One-component type; Polymer having isocyanate group alone Two-component type; Combination of a polymer having isocyanate group and a polyester having OH group A chemical reaction such as a crosslinking reaction occurs in both types, and an adhesive effect appears. Pot life is short, and this coating agent is expensive. Polyester and urethane anchor coating agent Saturated polyester resin or urethane resin is dissolved in a solvent such as ethyl acetate or toluene. Polyolefin anchor coating agent Polybutadiene anchor coating agent The anchor coat layer is preferably made extremely thin. The coating method may be gravure roll coating, kiss roll coating, curtain coating, bar coating, reverse roll coating, direct roll coating, air knife coating or the like.

Representative examples of the physical surface treatment are described below. Two or more kinds of the physical surface treatment may be combined, or the physical surface treatment may be combined with the coating of an anchor coating agent.

Flame treatment . . . Running cost is high, and there is the danger of fire.

Plasma treatment . . . Argon gas is converted into plasma, and joining surface is treated with the plasma. The treating strength is several times as much as corona discharge treatment, but the equipment cost for plasma treatment is several tenths higher than corona discharge treatment.

Corona discharge treatment . . . Treatable materials are various polymer films and sheets, aluminum foil aluminum vacuum metallized film, etc. This inexpensive treatment is widely utilized, and the treated effect is large.

Sandblasting treatment . . . Sand such as silica sand is blasted at a high pressure to the joining surface, and the surface is made rough.

Representative examples other treatments are as follows:

Chemical agent treatment . . . Treated with a dichromate solution or etc.

Ozone treatment . . . Treated in a box filled with ozone gas. Even though the resin temperatures of extrusion laminating is lowered, the adhesive strength is still improved.

Preheat treatment . . . The flexible sheet to be conducted with extrusion laminating preheated with a heat drum, hot air or etc.

Ultraviolet irradiation

High-frequency heating

Dielectric heating

Microwave heating, etc.

The L-LDPE resin extrusion laminating adhesive layer is provided by extrusion laminating method, and the thickness is about 5 to about 100 $\mu$m, preferably about 9 to about 50 $\mu$m.

One layer bonded by the L-LDPE resin extrusion laminating adhesive layer is a metal foil layer or a metallized flexible sheet layer.

The metal foil includes aluminum foil, tin foil, iron foil, lead foil, thin steel sheet coated with zinc and thin metal sheet formed by electrolysis, having a thickness of 5 to 50 $\mu$m.

Subsequently, a metallized flexible sheet which is particularly suitable for the packaging material of the invention is explained. Metallization is carried out according to a known method, such as vacuum evaporation, sputtering, ion plating, or electron beam heating. The metallic membrane layer may be formed on one face or both faces of the flexible sheet layer. The metallic membrane layer may be formed of a pure metal such as Al, Sn, Zn, Co, Cr, Ni, Fe, Cu, etc., alloys thereof, or any other metals of which metallic membrane layer can be made, but aluminum is the most preferable in terms of processing and cost. The thickness of the metallic membrane layer to be metallized is 55–1200 Å. When the thickness is thinner than 55 Å, antistatic property of the film is insufficient. Moreover, in order to secure moistureproof and light-shielding, the thickness of the flexible sheet layer must be increased, or another light-shielding layer must be incorporated. On the other hand, when the thickness is thicker than 1200 Å, degradation of the flexible sheet occurs by the heat of metallizing, and the strength of the laminated film to be formed falls. In the case of aluminum-metallized membrane, preferable thickness is 100 to 1200 Å, more preferably 200 to 800 Å, further more preferably 300 to 600 Å.

The flexible sheet to be metallized is about 5 to about 70 $\mu$m in thickness, and it is superior in physical strength, moistureproofness and gas barrier properties. The flexible sheet suitable for the invention includes various papers, synthetic papers, cellophane and thermoplastic resin films, having a thickness of 8 to 40 $\mu$m, and particularly preferable flexible sheets are polypropylene films, polyester films, high density polyethylene films, polyamide films, polystyrene films and the films of the blend resin of one or more of these resins and other resins, having a thickness of 8 to 30 $\mu$m and being uniaxially or biaxially oriented. Unstretched polypropylene films are also preferable because of large physical strength and inexpensiveness. The extremely thin reinforced films made of a high density polyethylene of which the blow-up ratio is large is particularly preferable because of large physical strength and inexpensiveness. In addition, aluminum metallized paper is also preferable.

The most preferable metallized flexible sheet layer is aluminum-vacuum metallized biaxially stretched thermoplastic resin film layer. When the metallized flexible sheet layer is hygroscopic one, such as aluminum-vacuum metallized biaxially stretched nylon film, the aluminum membrane layer is preferably disposed on the opposite side to the thermoplastic resin heat sealing layer in view of the improvement of moistureproofness and the prevention of layer separation.

Since the metal membrane layer is easily abraded and separated, a protection layer is preferably provided on the metal membrane layer. The usable resin for the protection layer includes butyral resin, acrylic resin, cellulose resins such as cellulose acetate resin, urethane resin, epoxy resin, polyester resin, ionomer resin, ethylene-ethyl acrylate copolymer resin, various polyethylene resins and various polypropylene resins. Besides, wax, gelatin, polyvinyl alcohol or the like is also usable. The thickness of the protection layer is made extremely thin such as thinner than 50 $\mu$m, preferably thinner than 5 $\mu$m, in order to eliminate static electricity effectively.

Such a protection layer may be formed by a known extrusion coating, solution coating or spray coating.

The thermoplastic resin heat seal layer contains preferably L-LDPE resin, and is laminated onto the metal foil or metallized flexible sheet layer through the aforementioned L-LDPE resin extrusion laminating adhesive layer. The thermoplastic resin heat seal layer is preferably composed of a polyolefin resin heat seal layer, particularly composed of the following high Young's modulus polyolefin resin heat seal layer and/or the ethylene copolymer resin heat seal layer described later. A particularly preferable layer is a coextruded multilayer film layer at least containing the high Young's modulus polyolefin resin heat seal layer and the ethylene copolymer resin heat seal layer.

The high Young's modulus polyolefin resin heat seal layer (high Young's modulus heat seal layer) is preferably composed of high density polyethylene (HDPE) resin or the blended resin of HDPE resin and L-LDPE resin in view of heat sealing properties and physical strength. Preferable HDPE resin has a MI of 0.1 to 5 g/10 minutes and a density of 0.945 to 0.970 g/10 minutes. L-LDPE resin may be selected from the aforementioned ones. The high Young's modulus heat seal layer may contain other polyolefin resins, such as LDPE resin, medium density polyethylene (MDPE) resin, polypropylene (PP) resin, ethylene-propylene copolymer resin (random type or block type), ethylene-(butene-1) copper resin, propylene-(butene-1) copolymer resin, ethylene-propylene-(butene-1) copolymer resin, poly(butene-1) resin, polystyrene resin, poly(methyl methacrylate) resin, styrene-acrylonitrile copolymer resin, ABS resin, crystalline propylene-$\alpha$-olefin copolymer resin, modified polypropylene resin, modified polyethylene resin, polypropylene-maleic anhydride graft copolymer resin, chlorinated polyolefin resin such as chlorinated HDPE resin, chlorinated LDPE resin, chlorinated ethylene copolymer resin and chlorinated atactic PP resin, ethylene-vinyl acetate copolymer (EVA) resin, ethylene ionomer resin (copolymer of ethylene and unsaturated acid is crosslinked by metal ion), poly(4-methylpentene-1) resin, ethylene-acrylic acid copolymer (EAA) resin, ethylene-methylacrylate copolymer (EMA) resin, ethylene-ethylacrylate copolymer (EEA) resin, vinyl chloride-propylene resin, ethylene-vinyl alcohol copolymer resin, crosslinked polyethylene resin (electron rays irradiation crosslinking, chemical crosslinking, etc.), polyisobutylene resin, ethylene-vinyl chloride copolymer resin and poly(1,2-butadiene)resin.

As the blending ratio, HDPE resin is 10 to 100 wt. %, preferably 15 to 80 wt. %, more preferably 20 to 60 wt. %, L-LDPE resin is 0 to 90 wt. %, preferably 20 to 85 wt. %, more preferably 40 to 80 wt. %, and other resin is 0 to 80 wt. , preferably 0 to 50 wt. %, more preferably 0 to 20 wt. %. The young's modulus of the high Young's modulus heat seal layer is usually higher than 30 kg/mm$^2$, preferably higher than 50 kg/mm$^2$.

The high Young's modulus heat seal layer may contain a light-shielding material including every material capable of shielding visible and ultraviolet light. Examples of the light-shielding material are various carbon black graphite, iron oxide, zinc white, titanium oxide, clay, aluminum powder, aluminum paste, calcium carbonate, mica, barium sulfate, talc, cadmium pigments, sulfur, red iron oxide, cobalt blue, copper-phthalocyanine pigments, monoazo and polyazo pigments and aniline black. Preferable light-shielding materials are highly light-absorptive or light-reflective material such as black pigment of various carbon black and light-reflective light-shielding materials of aluminum powder and aluminum paste from which volatile components are removed. Among these, carbon black is the most preferable one, and oil furnace carbon black is particularly preferred in terms of light-shielding character, cost and improvement of physical strength. On the other hand, since acetylene black, Ketschen carbon black and graphite have antistatic character, they are also preferred, though they are expensive. They may be blended with the oil furnace carbon black in order to improve its character. Suitable pH of carbon black is at 5 to 9, particularly at 6 to 8. Suitable mean particle size is smaller than 200 m$\mu$, and 10 to 20 m$\mu$, particularly 10 to 50 m$\mu$ is preferable. The oil furnace carbon black or the acetylene black having pH 6 to 9 and means particle size of 15 to 50 m$\mu$ are preferred. By using the carbon black of such pH and particle size, a packaging material having the following merits is obtained. That is, the occurrence of fogging is rare, increase or decrease of photosensitivity scarcely happens, light-shielding ability is great, the lumps of carbon black and pinholes such as fish eyes hardly occur, and physical strength and heat sealing properties are improved. The mean particle size of the light-shielding material is smaller than 200 m$\mu$, preferably smaller than 50 m$\mu$. By using such fine particles, film moldability is raised together with physical strength. The content of the light-shielding material is 0.5 to 50 g/m$^2$. When the content is less than 0.5 g/m$^2$, light-shielding is insufficient. While, when the content is more than 50 g/m$^2$, physical strength, heat sealing properties and moistureproofness greatly decrease. However, in the case that the light-shielding ability of the metal foil or metallized flexible sheet layer is sufficient, i.e. the optical density of the laminated film is more than 6, the minimum content of the light-shielding material is not restricted.

The form of the light-shielding material prior to blending may be powder, paste, wet state, masterbatch, pellets, etc.

As the method of blending a light-shielding material, the masterbatch method is preferred in points of cost and clear process. Various masterbatch methods are known, and any known method may be employed. Such a masterbatch method includes the method of dispersing carbon black into a polymer organic solvent solution to produce a masterbatch (Japanese Patent KOKOKU No. 40-26196) and the method of dispersing carbon black into polyethylene to produce a masterbatch (Japanese Patent KOKOKU No. 43-10362).

The fluidity of the resin is raised by blending a lubricant, such as fatty acid amide, silicone or higher fatty acid salt, and antiblocking ability, film processibility, packaging properties and the like are improved. The number of carbon atoms of fatty acid amide lubricant is about 10 to 50 , preferably 15 to 35, and the fatty acid amide lubricant, also includes alkylerre bis fatty acid amides. Examples of the fatty acid amide lubricant are oleic acid amide, erucic acid amide, stearic acid amide, palmitic acid amide, methylenebisstearic acid amide and ethylenebisstearic acid amide.

Examples of commercial lubricants suitable for the present invention include;

(Fatty acid amide)

"DIAMID G-200", "DIAMID O-200", "AMIDE AP-1",

"DIAMID-KN", "DIAMID-200" and "DIAMID-H" (Nippon Kasei Chemical Co., Ltd.)
"NEWTRON" (Nippon Fine Chemical Co., Ltd.)
"AMIDE-S", "AMIDE-T", "AMIDE-P", "AMIDE-ON" (Nitto Kagaku K. K.)
"ALFLOW E-10", "ALFLOW P-10", "ALFLOW S-10" (Nippon Oil and Fats Co., Ltd.)
"AMIDE-HT", "AMIDE-O", "ARMOSLIP-CP POWDER", "AMIDE-C" (lion Akzo Co., Ltd.)
"LUBROLL-EA" (ICI)
(Bis fatty acid amide)
"BISAMIDE", "DIAMID-200 BIS", "SLIPAX-KN" (Nippon Kasei Chemical Co., Ltd.)
"BISAMIDE" (Nitto Kagaku K. K.)
"ARMOWAX-EBS" (Lion Akzo Co., Ltd.)
"HOECHST WAX-C" (Hoechst, Japan)
"CHEMETRO WAX-100" (Nissan Ferro Chemical Co., Ltd.)
Chemical formulas of some examples are shown below;
Stearic acid amide lubricant $$CH_3(CH_2)_{16}COONH_2$$

"ALFLOW S-10" (Nippon Oil and Fats Co., Ltd.)
Oleic acid amide lubricant $$\begin{array}{l} CH-(CH_2)_7CH_3 \\ \parallel \\ CH-(CH_2)_7COONH_2 \end{array}$$

"ALFLOW E-10" (Nippon Oil and Fats Co., Ltd.)
Erucic acid amide lubricant $$\begin{array}{l} CH-(CH_2)_7CH_3 \\ \parallel \\ CH-(CH_2)_{11}COONH_2 \end{array}$$

"ALFLOW P-10" (Nippon Oil and Fats Co., Ltd.)
The fatty acid amide lubricant may be used together with a higher alcohol lubricant, a fatty acid ester lubricant or the like.

A suitable amount of the fatty acid amide lubricant is 0.03 to 1 wt. %, and the range of 0.05 to 0.5 wt. % is particularly suitable. When the amount is less than 0.03 wt. %, viscosity and temperature of the resin is raised by the frictional heat at its moulding, and decomposition and discoloration of the resin occur. Moreover, the slipping characters between the molded films, between the molded film and a photosensitive article or material to be packaged and between the molded film and a packaging machine become insufficient. On the other hand, when the amount is beyond 1 wt. %, gelation of the resin becomes insufficient, and the raw materials are not uniformly kneaded. Accordingly, the molded film partially contains unmelted parts and parts having different viscosities, and its physical strength is weak. In addition, the surface of the molded film becomes sticky. As a result, not only dust adheres on the surface, but bleed out occurs and causes trouble in development of the photosensitive films.

The fatty acid amide lubricant may be blended by masterbatch method or compound coloring method where the lubricant is uniformly blended in the final concentration from the first. Preferable resin for masterbatch has a MI of higher than the resin to be blended because of uniform blending. An antioxidant of less than 1.0 wt. % is optionally added to the thermoplastic resin heat seal layer. The antioxidant may be selected from those described previously.

The ethylene copolymer resin heat seal layer (L-LDPE resin heat seal layer) is composed of L-LDPE resin. The L-LDPE resin can be divided into two groups in respect of physical strength.

The first group of the L-LDPE resin is the copolymer of ethylene and butene-1 having a MI of 0.1 to 10 g/10 minutes and a density of 0.870 to 0.939 g/cm³. A representative example of this L-LDPE resin is produced by the unipole process developed by Union Carbide Co. This process is a low-pressure vapor phase process using a highly active catalyst. The resin is also produced by a liquid process and a modified high-pressure process utilizing ionic polymerization. The molecular weight distribution of the L-LDPE resin is narrower than the conventional LDPE resin produced by a high-pressure process at 3,000 atmospheres at 300° C. This resin is excellent in hot tack properties and seal ability of contraries, but it is liable to block. Its wear resistance is not so strong and the tear strength in longitudinal direction is usually weaker than that in lateral direction because of rather high molecular orientation. However, its physical strength is balanced, compared to the foregoing high Young's modulus heat seal layer, and it is excellent in elongation. Examples of the L-LDPE resin belonging to the first group are "G-RESIN UNIPOLE" (UCC) and "NUC-POLYETHYLENE-LL" (NIPPON UNICAR) manufactured by vapor phase process, "IDEMITSU POLYETHYLENE L" (IDEMITSU PETROCHEMICAL)), "NISSEKI LINIREX" (NIPPON PETROCHEMICALS) and "SUCLEAR" (DUPONT DE NEMOUR, CANADA) manufactured by liquid phase process, and "NORSOFLEX" (CDF CHIMIE) manufactured by modified high-pressure process.

The second group of the L-LDPE resin is the copolymer of ethylene and 4-methylpentene-1, hexene-1 or octene-1 having a MI of 0.1 to 10 g/10 minutes and a density of 0.870 to 0.939 g/cm³. This resin is superior in physical strength including tear strength but inferior in cost to the first group resin. Examples of the L-LDPE resin belonging to the second group are "TUFLIN" (UCC) manufactured by vapor phase process, and "ULTZEX"(MITSUI PETROCHEMICAL INDUSTRIES), "STAMILEX" (DSM) and "DOWLEX" (DOW CHEMICAL) manufactured by liquid phase process.

The L-LDPE resin heat seal layer may contain other polyolefin resin(s) selected from described previously including HDPE resin. The content of other polyolefin reins(s) is less than 60 wt. %, preferably less than 50 wt. %, i.e. the content of L-LDPE resin is more than 40 wt. %, preferably more than 50 wt. %. The L-LDPE resin heat seal layer may also contain light-shielding material, lubricant, antioxidant, etc. These additives may be selected from those described previously.

In the case that the thermoplastic resin heat seal layer is a coextruded multilayer film layer comprising a high Young's modulus heat seal layer and a L-LDPE resin heat seal layer, the coextruded multilayer film layer may contain one or more intermediate layers such as ionomer resin excellent in adhesive property, ethylene copolymer resin or the resin containing conductive material between them. On the other hand, the thermoplastic resin heat seal layer may be a single layer. In this case, suitable thermoplastic resin heat seal layer is a polyolefin resin layer, and a high Young's modulus heat seal layer and a L-LDPE resin heat seal layer are preferable. However, the most preferable layer is the coextruded layer containing a high Young's modulus heat seal layer and a L-LDPE resin heat seal layer. The L-LDPE resin film layer is excellent in heat sealing properties, tear strength, impact puncture strength, etc., but it has a problem in tensile strength and wear resistance. The Young's modulus is also low. These defects are compensated by the high Young's modulus heat seal layer. On the other hand, the L-LDPE resin film layer compensate the defects of the high Young's modulus heat seal layer in inflation film moldability, heat sealing properties, tear strength, impact puncture strength and bag-making ability. In inflation process, the high Young's modulus heat seal layer is preferably disposed on the outside, i.e. the L-LDPE resin film layer is disposed on the inside, in respect to uniform thickness, not wrinkling and not furrowing.

The thickness of the thermoplastic resin heat seal layer is 30 to 150 $\mu$m. When the thickness is less than 30 $\mu$m, a problem arises in film moldability, particularly in the occurrence of wrinkling. It is also difficult to secure the properties necessary for photographic photosensitive materials such as moistureproofness, light-shielding physical strength, heat seal strength and the like. On the other hand, when the thickness is beyond 150 $\mu$m, shear rate is high, and melt fracture occurs even though the resin temperature is raised. When the thermoplastic resin heat seal layer is coextruded multilayer film layer, the thickness balance between the high Young's modulus heat seal layer and the L-LDPE resin heat seal layer is important in view of the prevention of curling, film moldability, physical strength and packaging properties for photographic photosensitive materials. When the thickness of the L-LDPE resin heat seal layer is less than 30% of the total thickness of the thermoplastic resin heat seal layer, it is insufficient to compensate the defects of the high Young's modulus heat seal layer having a high crystallinity and a restricted MI and density, i.e. poor film moldability, weak tear strength in longitudinal direction and weak impact puncture strength. Particularly, in the case of packaging a roll or sheets of photographic photosensitive material, the laminated film is liable to break by the sharp edge, and thereby, light-shielding, moistureproofness, gas barrier properties, etc. cannot be secured. On the other hand, when the thickness of the L-LDPE resin heat seal layer is beyond 70% of the total thickness of the thermoplastic resin heat seal layer, the Young's modulus is low. The wear resistance and the tensile strength are inferior, and in the case of packaging a roll or sheets of photographic photosensitive material, the laminated film is liable to break by the sharp edge. Moreover, the moistureproofness and the gas barrier properties are inferior. The film moldability is also poor, and blocking and wrinkling are liable to occur. The film is elongated by the tension loaded at the time of the lamination to a flexible sheet, and the laminated film curls. It is the most preferable that the thickness of the high Young'as modulus heat seal layer is almost the same as the L-LDPE resin heat seal layer. The Young's modulus of the thermoplastic resin heat seal layer is preferably higher than 40 kg/mm$^2$.

The high Young's modulus heat seal layer is preferably disposed on the inner surface side to touch the photosensitive materials packaged therein. By this arrangement, the packaging material is made strong to the photosensitive material having a sharp edge, and abrasion mark and pressure mark of photographic photosensitive materials can be prevented.

When the coextruded multilayer film layer is laminated to both faces of the metal foil or metallized flexible sheet layer, the laminated film not or hardly curled can be obtained. Either face of the laminated film may be used as heat seal layer, and the laminated film is excellent in physical strength. Moreover, since another flexible sheet is not necessary to provide, stock cost is saved, and the manufacturing cost of the coextruded multilayer film is reduced by mass production.

Various additives may be added to the high Young's modulus heat seal layer and the L-LDPE resin heat seal layer. Examples of the additives are described below.

(1) Plasticizer; phthalic acid esters, glycol ester, fatty acid ester, phosphoric acid ester, etc.
(2) Stabilizer; lead compounds, cadmium compounds, zinc compounds, alkaline earth metal compounds, organic tin compounds, etc.
(3) Antistatic agent; cation surfactants, anion surfactant, nonion surfactant, ampholytic surfactants, etc.
(4) Flame retardant; phosphoric acid ester, phosphoric acid ester halides, halides, inorganic materials, polyols containing phosphor, etc.
(5) Filler; alumina, kaolin, clay, calcium carbonate, mica, talc, titanium oxide, silica, etc.
(6) Reinforcing agent; glass lobing, metallic fiber, potassium titanate fiber, glass fiber, glass milled fiber, carbon fiber, etc.
(7) Blowing agent; inorganic blowing agents (ammonium carbonate, sodium hydrogen carbonate), organic blowing agents (nitroso compounds, azo compounds), etc.
(8) Vulcanizing agent; vulcanization accelerator, acceleration assistant, etc.
(9) Deterioration preventing agent; ultraviolet absorber, antioxidant, metal deactivator, peroxide decomposing agent, etc.
(10) Coupling agent; silane compounds, titanium compounds, chromium compounds, aluminum compounds, etc.
(11) Various thermal resin, rubbers, etc.

In the laminated film of the invention, the optical density of the transmitted light is more than 4.0, the moisture permeability is less than 2.0 g/m$^2$.24 hours, and the frictional electrification is lower than 50 KV. The optical density of the packaging material is measured by a photometer ("FSD-103" manufactured by Fuji Photo Film Co., Ltd., detectable maximum optical density is 4.0.), and moisture permeability is measured according to JIS Z-0208. The frictional electrification is measured by than an endless belt of each exemplified film having 35 mm in width and 1350 mm in length was prepared, this belt is run between two SUS rollers loaded with 500 g at a speed of 12 m/min. The frictional electrification is determined by a voltmeter.

A heat-resistant flexible sheet layer may be laminated to the metal foil or metallized flexible sheet layer. Thereby, it has been achieved to secure the high Young's modulus which brings the prevention of abrasion and the improvement of tensile strength. It has also been achieved to improve heat resistance, heat sealing properties, printability and physical strength. Moreover, the use of a metal membrane layer can be prevented. In view of the contamination with the gas and the impurities harmful to photographic emulsion layer, cost, uniformity, quality, moistureproofness, appearance, printability, physical strength and the like, preferable flexible sheets are uniaxially or biaxially oriented or stretched films of a thermoplastic resin such as polyester, polyamide, polypropylene, HDPE, L-LDPE, polystyrene or polyvinylidene chloride, bleached kraft paper, polyvinylidene chloride-coated cellophane, synthetic pulp paper, white glassine paper, coated paper, synthetic paper, nonwoven fabric, neutral paper, lint-free paper, synthetic fiber and the like. In the case that the packaging material is not directly in contact with the photosensitive material by using a pad or the like, or in the case that the photosensitive material is hardly affected by gas or impurities, it is preferable to use a mass-produced inexpensive paper, such as unbleached kraft paper, semibleached kraft paper, Clupak paper, duostress paper, pure white roll, machine-made paper, cellophane or glassine paper.

Flexible sheet layers may be laminated to the metal foil or metallized flexible sheet layer according to a known method such as a heat sealing (hot bar sealing, impulse heat sealing, supersonic heat sealing, etc.) or the method using an adhesive (wet laminating, dry laminating, hot melt laminating, extrusion laminating, etc.). The adhesive may be a known one, however, the aforementioned extrusion laminating adhesive layer is preferable.

Package form may be usual, and includes a single-sheet flat bag, a double-sheet flat bag, a self-standing bag, a single-sheet gusset bag, a double-sheet gusset bag, inner lining for a moisture proof box and a leader paper. The sealing form may also be usual, and includes heat sealing, impulse heat sealing, supersonic sealing and high frequency sealing. The methods of using an adhesive may also be utilized.

In the packaging material of the invention, by incorporating the extrusion laminating adhesive layer containing L-LDPE resin, tear strength and impact puncture strength are remarkably improved. Since the adhesive layer is excellent in ductility, not only pinhole troubles decrease to improve moistureproofness, but also laminating speed can be raised. The adhesive layer can be made thin. By using the blend resin of L-LDPE resin and LDPE resin having particular properties, the increase of motor load and resin discharge pressure can be prevented in the case of setting the same discharge as the conventional adhesive layer. The occurrence of melt fracture, the increase of neck-in, the lowering of adhesive strength, the oxidation of resin by temperature elevation and the like can also be prevented.

By incorporating the metal foil or metallized flexible sheet layer, preferably metallized such as aluminum-vacuum metallized uniaxially or biaxially oriented thermoplastic resin film layer, the high Young's modulus to prevent deviate elongation and curling and to secure tensile strength can be obtained. The metal foil or metallized flexible sheet layer improves heat resistance, physical strength, moistureproofness, gas barrier, antistatic property, appearance and the right-reverse judgement under a safety light in a dark room. It also prevents temperature elevation under the sunlight to cause the degradation of the quality of photosensitive materials.

By incorporating the coextruded multilayer film layer comprising the high Young's modulus heat seal layer and the L-LDPE resin heat seal layer which is a preferable embodiment of the thermoplastic resin heat seal layer, the curling and deviate elongation caused by the tension loaded at lamination can be prevented. This effect is remarkable in the case of using the coextruded multilayer film layer having a Young's modulus of higher than 40 kg/mm$^2$. The high Young's modulus heat seal layer improves tensile strength, surface strength, wear resistance, antiblocking property, slipping character and the like. On the other hand, the L-LDPE resin heat seal layer improves tear strength, impact puncture strength, ductility, film moldability and the like, and it prevents the lowering of physical strength causes by the blend of light-shielding material. Heat sealing properties and physical strength are particularly improved by containing L-LDPE resin.

The packaging material of the invention is excellent in laminating properties including ductility, thinning ability and laminating speed, no occurrence of pinhole and physical strength. As a result, even in the case of the sheet films such as lithfilms or cut films or the roll of photographic film or photographic printing paper having sharp edges, they may be packaged by a single package. Thus, not only the cost of packaging material is decreased, but also packaging work is reduced.

Representative embodiments of the packaging material of the invention are illustrated in FIGS. 1 to 10.

The packaging material of FIG. 1 consists of a light-shielding thermoplastic resin heat seal layer Ia composed of a high Young's modulus heat seal layer 1a containing a light-shielding material and a L-LDPE resin heat seal layer 2a containing a light-shielding material, a metallized flexible sheet layer IIIM composed of a flexible sheet layer 3 and a metal membrane layer M laminated on the L-LDPE resin heat seal layer 2a through a L-LDPE resin extrusion laminating adhesive layer 5, and a flexible sheet layer 4 laminated on the metal membrane layer M through a L-LDPE resin extrusion laminating adhesive layer 5.

Figure 2:
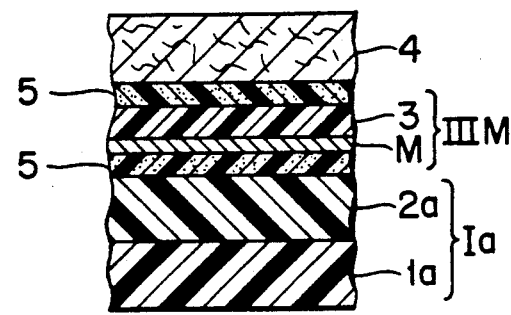

The packaging material of FIG. 2 is the same as the packaging material of FIG. 1, except that the position of the metal membrane layer M and the flexible sheet 3 is reversed.

Figure 3:
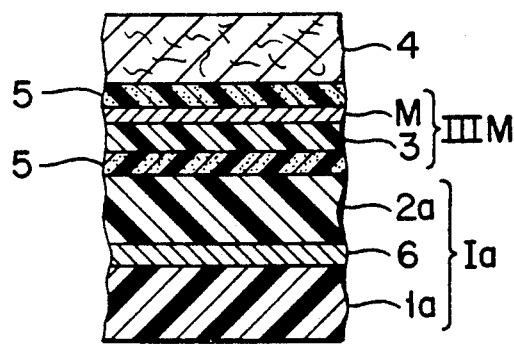

The packaging material of FIG. 3 is the same as the packaging material of FIG. 1, except that an intermediate layer 6 is incorporated between the light-shielding high Young's modulus heat seal layer 1a and the light-shielding L-LDPE resin heat seal layer 2a.

Figure 4:
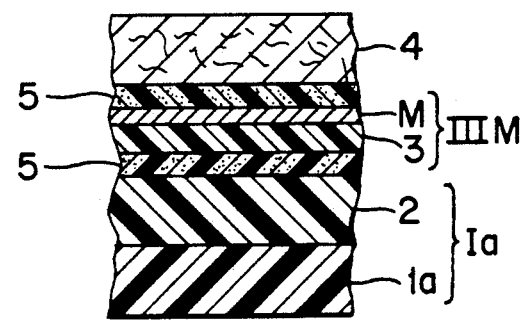

The packaging material of FIG. 4 is the same as the packaging material of FIG. 1, except that the L-LDPE resin heat seal layer 2 does not contain a light-shielding material.

Figure 5:
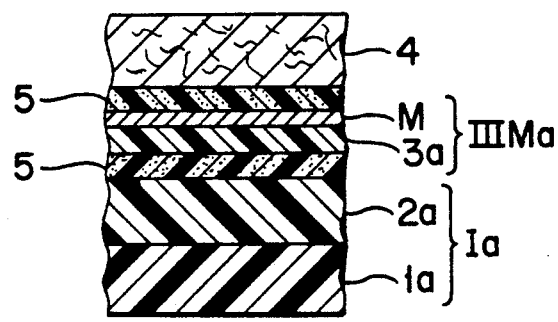

The packaging material of FIG. 5 is the same as the packaging material of FIG. 1, except that the flexible sheet layer 3a contains a light-shielding material.

Figure 6:

The packaging material of FIG. 6 is the same as the packaging material of FIG. 2, except that the high Young's modulus heat seal layer 1 does not contain a light-shielding material and the flexible sheet layer 4a contains a light-shielding material.

Figure 7:
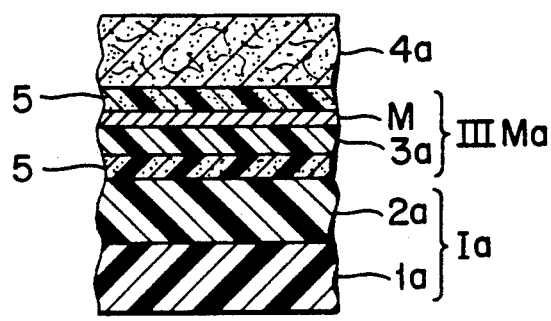

The packaging material of FIG. 7 is the same as the packaging material of FIG 5, except that the flexible sheet layer 4a contains a light-shielding material.

Figure 8:
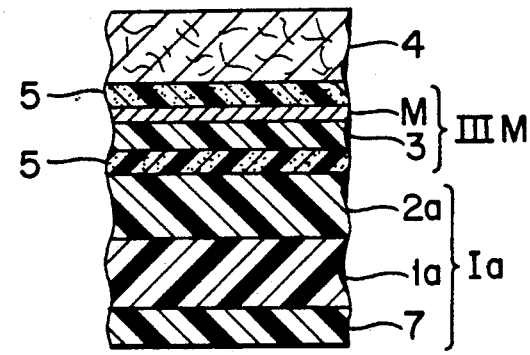

The packaging material of FIG. 8 is the same as the packaging material of FIG. 1, except that a coated heat seal layer 7 is provided under the high Young's modulus heat seal layer 1a.

Figure 9:
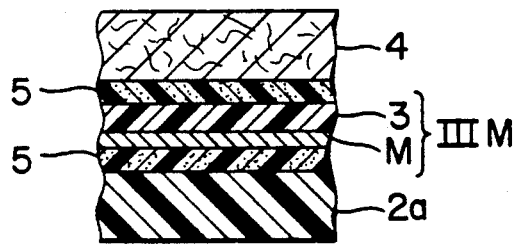

The packaging material of FIG. 9 is the same as the packaging material of FIG. 2, except that the thermoplastic resin heat seal layer is composed of the light-shielding L-LDPE resin heat seal layer 2a alone.

Figure 10:
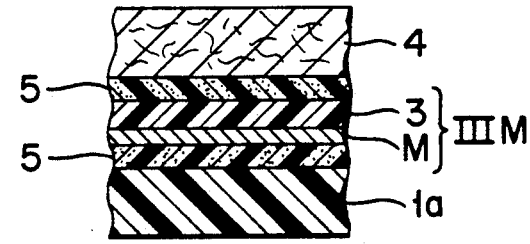

The packaging material of FIG. 10 is the same as the packaging material of FIG. 2, except that the thermoplastic resin heat seal layer is composed of the light-shielding high Young's modulus heat seal layer 1a alone.

Some structure of the metallized flexible sheet layer usable for the packaging material of the invention are illustrated in FIGS. 11 to 14.

Figure 11:
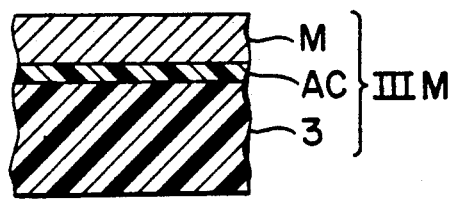
FIGS. 11 to 14 are partially sectional views indicating several layer compositions of the metallized flexible sheet layer used for the packaging material of the invention.

The metallized flexible sheet layer IIIM of FIG. 11 consists of a flexible sheet layer 3, an anchor coat layer AC coated thereon, and a metal membrane layer M metallized thereon.

Figure 12:
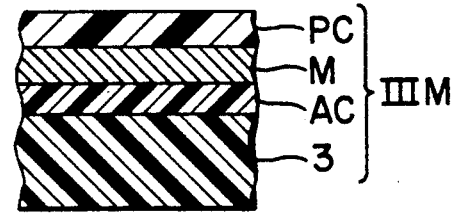

In the metallized flexible sheet layer IIIM of FIG. 12, a protection layer PC is provided on the metal membrane layer M of the metallized flexible sheet layer IIIM of FIG. 11.

Figure 13:

The metallized flexible sheet layer IIIM of FIG. 13 consists of a flexible sheet layer 3 and a metal membrane layer M directly provided thereon.

Figure 14:
Figure 15:
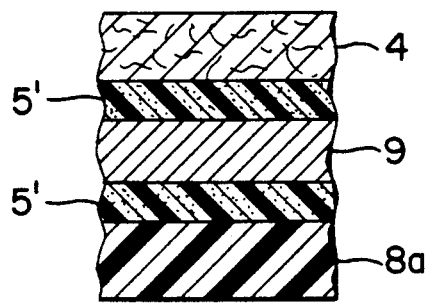
FIGS. 15 to 17 are partially sectional views of conventional packaging materials.

In the metallized flexible sheet layer IIIM of FIG. 14, a protection layer PC is provided on the metal membrane layer M of the metallized flexible sheet layer IIIM of FIG. 13.

EXAMPLES

The packaging material of Example I corresponded to the embodiment of FIG. 1. The high Young's modulus heat seal layer 1a was composed of 72.5 wt. % of HDPE resin ("HIZEX 5300S", MI; 0.40 g/10 minutes, Density; 0.964 g/cm$^3$, Mitsui Petrochemical Industries), 20 wt. % of L-LDPE resin ("ULTZEX 2020L", α-olefin; 4-methylpentene-1, MI; 2.1 g/10 minutes, Density; 0.920 g/cm$^3$, Mitsui Petrochemical Industries), 4.5 wt. % of LDPE resin ("DFD-0111", MI: 2.4 g/10 minutes, density; 0.923 g/cm$^3$, Nippon Unicar) and 3 wt. % of oil furnace carbon black ("#44B", Mean particle size; 21 mμ, pH 7.7, Mitsubishi Chemical Industries), and the thickness was 35 μm. The L-LDPE resin heat seal layer 2a was composed of 92.5 wt. % of L-LDPE resin which is a blended resin of 80 parts by weight of the above L-LDPE resin ("ULTZEX 2020L") and 20 parts by weight of another L-LDPE resin ("ULTZEX 2021L", α-olefin; 4-methylpenetene-1 MI; 2.1 g/10 minutes, Density; 0.920 g/cm$^3$, Mitsui Petrochemical Industries), 4.5 wt. % of the above LDPE resin ("DFD-0111") and 3 wt. % of the above oil furnace carbon black ("#44B"), and the thickness was 35 μm. The above two heat seal layer was formed by an inflation film molding machine. The metallized flexible sheet layer IIIM was composed of a biaxially stretched nylon film 15 μm in thickness and a vacuum metallized aluminum membrane layer M 400 Å in thickness. As the other flexible sheet layer 4, a bleached kraft paper having an areal weight of 35 g/m$^2$ was used. Both L-LDPE resin extrusion laminating adhesive layers 5,5 were the same, and composed of 80 wt. % of L-LDPE resin (α-olefin; butene-1, Liquid phase method) and 20 wt. % of LDPE resin. The MI of the adhesive layer was 10 g/10 minutes and the density was 0.910 g/cm$^3$. The thickness was 15 μm.

The packaging material of Example II corresponded to the embodiment of FIG. 1, and had the same composition as Example I, except that the blending ratio of the L-LDPE resin extrusion laminating adhesive layers 5,5 was changed to 40 wt. % of the L-LDPE resin and 60 wt. % of the LDPE resin. The MI of the adhesive layer was 10 g/10 minutes, and the density was 0.925 g/cm$^3$.

The packaging material of Example III also corresponded to the embodiment of FIG. 1, and had the same composition as Example I, except that the L-LDPE resin produced by vapor phase method was used for the L-LDPE resin extrusion laminating adhesive layers 5,5 and the blending ration was changed to 50 wt. % of the L-LDPE resin and 50 wt. % of the LDPE resin. The MI of the adhesive layer was 9.0 g/10 minutes, and the density was 0.920 g/cm$^3$.

Comparative packaging material I corresponded to the embodiment of FIG. 1, and had the same composition as Example I, except that the adhesive layers were composed of another L-LDPE resin (α-olefin; butene-1, Vapor phase method, MI; 12 g/10 minutes, Density; 0.926 g/cm$^3$).

Comparative packaging material II also corresponded to the embodiment of FIG. 1, and had the same composition as Example 1, except that the adhesive layers were composed of a LDPE resin (MI; 5 g/10 minutes, Density; 0.918 g/cm$^3$).

Figure 16:
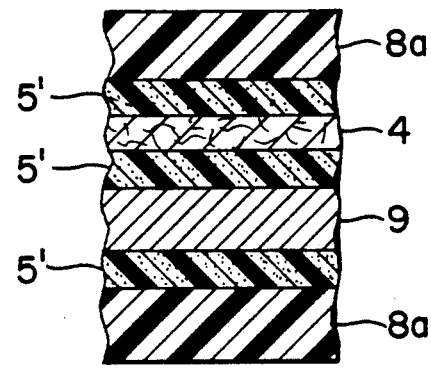
Figure 17:
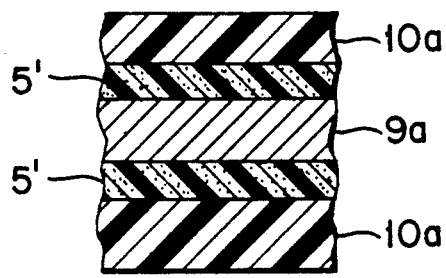

Conventional packaging material I corresponded to the composition of FIG. 16. A light-shielding LDPE resin film layer 8a 50 μm in thickness containing 3 wt. % of carbon black as heat seal layer, an aluminum foil layer 9 having a thickness of 7 μm, a bleached kraft paper layer 4 having an areal weight of 35 g/m$^3$, and another light-shielding LDPE resin film layer 8a 50 μm in thickness containing 30 wt. % of isobutylene rubber and 3 wt. % of carbon black laminated in this order each through the same LDPE resin extrusion laminating adhesive layer 5' as comparative packaging material II.

An antioxidant, particularly a phenol antioxidant, of less than 0.3 wt. % is preferably added to the thermoplastic resin heat seal layer containing HDPE resin or L-LDPE resin in order to prevent adverse influence of the lumps produced by oxidation of the resin upon photographic photosensitive materials. It is also preferable to blend the carbon black excellent in the inhibition of the oxidation of HDPE resin or L-LDPE resin in the same viewpoint. Besides, the blending of a lubricant such as a fatty acid amide or a higher fatty acid and another resin such as LDPE resin or EEA resin is also preferable because film can be molded by using a conventional molding machine without modification.

Various properties of these packaging materials were measured, and shown in Table 1.

TABLE 1

|  | Invention | | | Comparative | | Conventional |
|---|---|---|---|---|---|---|
|  | I | II | III | I | II | I |
| Layer Composition | FIG. 1 | FIG. 1 | FIG. 1 | FIG. 1 | FIG. 1 | FIG. 16 |
| Adhesive Layer | | | | | | |
| L-LDPE Resin | Butene-1 | FIG. 1 | FIG. 1 | FIG. 1 | — | — |
|  | Liq. Phase | FIG. 1 | Vap. Phase | FIG. 1 | | |
| L-LDPE Resin Content (wt. %) | 80 | 40 | 50 | 100 | 0 | 0 |
| LDPE Resin Content (wt. %) | 20 | 60 | 50 | 0 | 100 | 100 |
| MI (g/10 min.) | 10.0 | 10.0 | 9.0 | 12.0 | 5.0 | 5.0 |
| Density (g/cm$^3$) | 0.910 | 0.925 | 0.920 | 0.926 | 0.918 | 0.918 |
| Adhesive Layer | | | | | | |

TABLE 1-continued

|  | Invention | | | Comparative | | Conventional |
| --- | --- | --- | --- | --- | --- | --- |
|  | I | II | III | I | II | I |
| Neck-in (mm) | 58 | 51 | 49 | 76 | 48 | 48 |
|  | B-C | B | B | E | B | B |
| Motor Load | B-C | B | B-C | D-E | B | B |
| Ductility | A | A | A | B | D | D |
| Pinhole | A | A | A | A | D | D |
| Tear Strength MD (g) | 832 | 597 | 683 | 792 | 492 | 294 |
| Tear Strength CD (g) | 1384 | 1123 | 1288 | 1436 | 758 | 610 |
| Cost Ratio | 60 | 80 | 70 | 90 | 100 | 140 |

Evaluations in Table 1 were carried out as follows;

| A very excellent | B excellent |
| --- | --- |
| C practical | D having a problem |
| E impractical | |

Testing methods were as follows:

| Melt Index; | ASTM D-1238 |
| --- | --- |
| Density; | ASTM D-1505 |

Neck in; Indicated as the difference between the width (×m) of the L-LDPE resin extrusion laminating adhesive layer extruded from a T die and the effective width (a mm) to laminate the thermoplastic resin heat seal layer to the metal foil or metallized flexible sheet layer.

X mm=1000 mm

Laminating speed=100 m/min. Neck-in=(X-a)nm

Motor Load; Judged by the motor load at the time when the adhesive layer was extruded from a T die in a laminating speed of 100 m/min. in a width of 1000 mm in a thickness of 15 μm.

Ductility; Judged by the maximum laminating speed of the adhesive layer at the time when it was extruded under the same conditions as the above motor load measurement.

Pinhole; Judged by the occurrence of pinholes at the time when each adhesive layer containing 3 wt. % of carbon black was extruded under the same conditions as the above motor load measurement. Evaluation was carried out by visual inspection.

Tear Strength; JIS P-8116

Cost Ratio; The lamination cost ratio of each adhesive layer. The lamination cost of Comparative packaging material II was set 100.

I claim:

1. A packaging material for photosensitive materials, comprising a laminated film comprising a thermoplastic resin heat seal layer comprised of coextruded thermoplastic resin layer and an ethylene copolymer layer, a layer of metallized flexible sheet, and a layer of linear low density polyethylene resin extrusion laminating adhesive positioned therebetween, wherein said layer or linear low density polyethylene resin extrusion laminating adhesive comprises a blend of 30 to 90 wt. % linear low density polyethylene resin in the form of a copolymer of ethylene and α-olefin, and 10 to 70 wt. % high pressure low density polyethylene resin, said layer of linear low density polyethylene resin extrusion laminating adhesive having a melt index of 5 to 20 g/10 minutes, a density of 0.870 to 0.930 g/cm$^3$, an optical density of transmitted light or more than 4.0, and a moisture permeability of less than 2.0 g/m$^2$ per 24 hours.

2. The packaging material claim 1 wherein the frictional electrification of said laminated film is lower than 50 KV.

3. The packaging material of claim 1 wherein said metallized flexible sheet layer is a metallized flexible sheet layer of which the flexible sheet layer is selected from the group consisting of uniaxially or biaxially stretched films of polyethylene resin, polyamide resin, polystyrene resin and blended resin of any one of these resins and another resin, unstretched polypropylene resin, unstretched high density polyethylene resin and aluminum metallized paper.

4. The packaging material of claim 1 wherein said thermoplastic resin heat seal layer comprises high Young's modulus heat seal layer having a Young's modulus of higher than 30 kg/mm$^2$ and a resin composition of 10 to 100 wt. % of high density polyethylene resin, 0 to 90 wt. % of linear low density polyethylene resin and 0 to 80 wt. % of other resins(s).

5. The packaging material of claim 1 wherein said thermoplastic resin heat seal layer comprises a L-LDPE resin heat seal layer containing more than 40 wt. % of linear low density polyethylene resin.

6. The packaging material of claim 1 wherein said thermoplastic resin heat seal layer is a coextruded multilayer film layer comprising a high Young's modulus heat seal layer having a Young's modulus of higher than 30 kg/mm$^2$ and a resin composition of 10 to 100 wt. % of high density polyethylene resin, 0 to 90 wt. % of linear low density polyethylene resin and 0 to 80 wt. % of other resin(s) and a L-LDPE resin heat seal layer containing more than 40 wt. % of linear low density polyethylene resin.

7. The packaging material of claim 8 which further contains flexible sheet layer laminated to the metallized flexible sheet layer.

* * * * *